P. B. DONAHOO.
PIVOT LIGHT.
APPLICATION FILED JUNE 19, 1909.
967,620.
Patented Aug. 16, 1910.
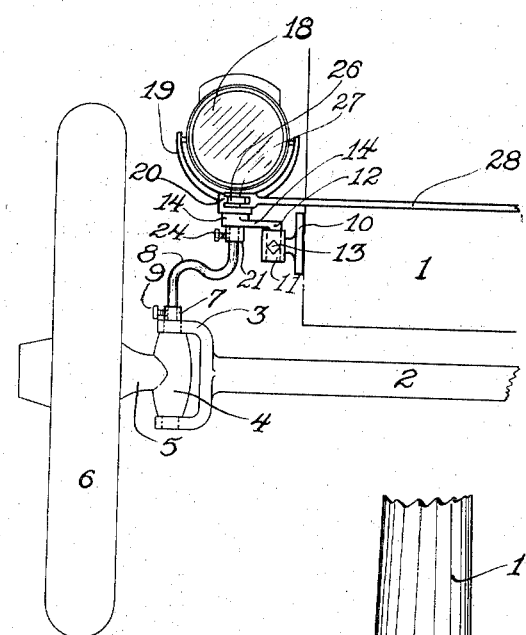
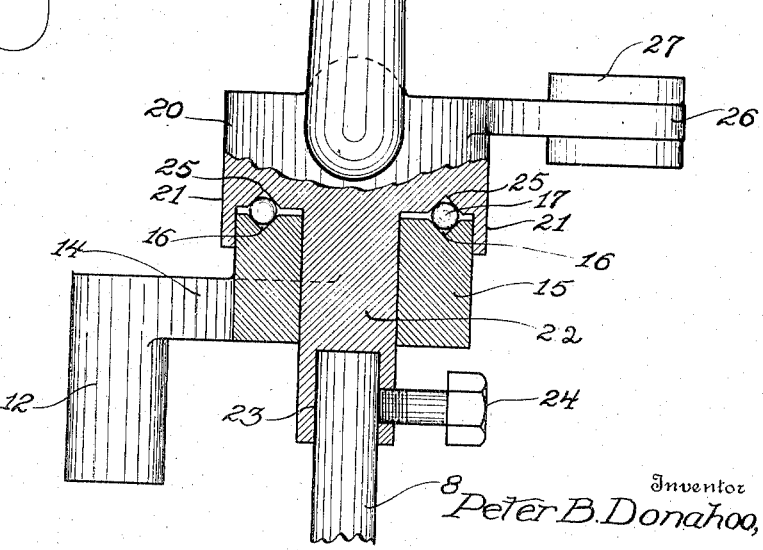

UNITED STATES PATENT OFFICE.

PETER B. DONAHOO, OF OAKLAND, CALIFORNIA, ASSIGNOR TO ALFRED H. LENT, OF OAKLAND, CALIFORNIA.

PIVOT-LIGHT.

967,620.  Specification of Letters Patent.  Patented Aug. 16, 1910.

Application filed June 19, 1909. Serial No. 503,177.

*To all whom it may concern:*

Be it known that I, PETER B. DONAHOO, citizen of the United States, residing at Oakland, in the county of Alameda and State of California, have invented certain new and useful Improvements in Pivot-Lights, of which the following is a specification, reference being had therein to the accompanying drawing.

This invention relates to headlights for motor or other vehicles, and the principal object of the same is to provide a connection between one headlight and the turning gear of a vehicle so that said light will be caused to turn with said gear.

The invention is especially adapted for use in connection with motor vehicles in which the headlights are arranged on each side of the front of the machine, and the present invention contemplates the employment of a flexible shaft one end of which is connected to one of the knuckle bearings of one of the steering wheels, the other end of said shaft being connected with a pivotally mounted headlight, so that the movements of said knuckle will be imparted to said light to cause the same to turn with the steering wheels.

In connection with the foregoing, the invention also contemplates the employment of a connecting rod between the two head lights so that the movement of the light that is connected with the knuckle will be communicated to the lamp on the opposite side of the vehicle.

It will be understood, of course, that in carrying out the objects of the invention generally stated above the essential features of the same are necessarily susceptible of changes in details and structural arrangements, but a preferred and practical embodiment thereof is shown in the accompanying drawings, wherein—

Figure 1 is a detail front elevation of a portion of the front of a motor vehicle showing the improved headlight operating mechanism applied thereto. Fig. 2 is a fragmentary view in elevation, partly in section showing the lamp frame or support, its pivotal mounting, and the connection between the same and the operating shaft.

Referring to said accompanying drawings by numerals, 1 designates the front portion of the body of a motor vehicle, 2 the front axle thereof provided with the forked end 3 in which the knuckle bearing 4 is journaled and which projects from the hub 5 of one of the front wheels 6. The upper end of the knuckle bearing 4 projects through the fork 3 and forms a socket 7 for the reception of one end of a flexible shaft 8 which is detachably held within said socket by means of a thumb screw 9.

A bracket 10 is rigidly connected with the side of the body of the vehicle and carries an outstanding vertically arranged bearing 11 for a pivot pin 12 which may be rotatably held in said bearing by means of a thumb screw 13. The upper end of said pin projects beyond the upper end of the bearing 11 and is arranged at right angles to said pin to provide an arm 14. The outer end of said arm terminates in an upstanding bearing ring 15 the top surface of which is provided with a groove 16 for the reception of anti-friction bearings 17.

A head light 18 is pivotally mounted in a fork 19 the enlarged base 20 of which is provided with a pendent annular bottom flange 21 which fits over the top of the bearing ring 15, said base being also provided with a centrally located pendent pin 22 which projects through the bearing ring 15 and has a longitudinal opening 23 formed in its lower end which forms a socket for the reception of the upper end of the flexible shaft 8, said shaft being detachably held within said socket by means of the thumb screw 24. The bottom surface of the base 20 of the lamp fork is provided with an annular groove 25 complemental to the groove 16 formed in the bearing ring, said grooves forming a raceway for the antifriction bearings. The front of said base 20 carries an outstanding laterally projecting lug 26 which is engaged by the bifurcated end 27 of a rod 28 that extends across the front of the machine and has its opposite end connected with a base of a lamp supporting fork located on the opposite side of the machine, not shown.

It will be seen from the foregoing that when the knuckle 4 is turned its movements will be imparted to the shaft 8, and said shaft will impart such movement to the base of the lamp carrying fork 19 so as to cause the lamp 18 to turn with said knuckle. And as said base is connected with the lamp carrier on the opposite side of the machine, the last mentioned lamp will move with the first mentioned lamp, thereby assuring of both lamps throwing their light in the direction in which the machine is being steered. It will also be understood from the described manner of mounting the lamp 18, the slightest movement of the shaft 8 will be communicated thereto, and through the use of the flexible shaft, the vibration of the steering gear will be absorbed by said shaft, so that none of such vibrations will be communicated to the headlight.

What I claim as my invention is:—

1. A device of the character described, comprising a lamp bracket carried by a vehicle, an arm mounted thereon and provided with a bearing ring in its outer end, the upper surface of which is provided with anti-friction bearings, a lamp support having a base mounted upon said ring and provided with a pin projecting through said ring, and a flexible shaft having one end connected to the turning gear of the vehicle and the other end connected with said pin.

2. A device of the character described, comprising a lamp bracket carried by a vehicle, and provided with a socket bearing, an arm provided with a pivot pin adapted to be detachably secured in said socket, said arm also provided with an upstanding bearing ring, a lamp support having a base provided with an annular flange adapted to be fitted over the top of said bearing ring and rotatably mounted thereon, said base also provided with a pendent pin adapted to be rotatably mounted in said ring, said pin provided with a socket in its free end, and a flexible shaft having one end adapted to be connected to the turning gear of the vehicle and the other end adapted to be rigidly seated in the socket opening of the pin of the lamp support.

In testimony whereof I hereunto affix my signature in presence of two witnesses.

PETER B. DONAHOO.

Witnesses:
F. P. SCHROEDER,
H. C. SCHROEDER.